(12) United States Patent
Döbereiner

(10) Patent No.: US 7,757,797 B2
(45) Date of Patent: Jul. 20, 2010

(54) DRIVE FOR A TRACK-LAYING VEHICLE

(75) Inventor: Rolf Döbereiner, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 631 days.

(21) Appl. No.: 10/944,399

(22) Filed: Sep. 17, 2004

(65) Prior Publication Data

US 2005/0187067 A1  Aug. 25, 2005

(30) Foreign Application Priority Data

Feb. 23, 2004  (DE) .................. 10 2004 009 030

(51) Int. Cl.
*B60L 11/00* (2006.01)
(52) U.S. Cl. .................. 180/65.31; 180/65.6
(58) Field of Classification Search ............... 180/65.3, 180/65.2, 65.6, 65.7; 903/921, 922, 923, 903/924
See application file for complete search history.

(56) References Cited

U.S. PATENT DOCUMENTS

| | | | | |
|---|---|---|---|---|
| 3,938,604 A * | 2/1976 | Kugler et al. ............... | 180/6.44 |
| 4,327,603 A * | 5/1982 | Zaunberger et al. ........... | 475/22 |
| 4,328,876 A * | 5/1982 | Horsch ....................... | 180/6.44 |
| 4,331,208 A * | 5/1982 | Kolthoff et al. ............... | 180/6.2 |
| 4,428,468 A * | 1/1984 | Chatterjea ................. | 192/13 R |
| 4,464,973 A * | 8/1984 | Rodler, Jr. ................. | 89/40.03 |
| 4,890,508 A * | 1/1990 | Zaunberger .................. | 475/19 |
| 4,960,404 A * | 10/1990 | Reppert et al. ................ | 475/23 |
| 4,998,591 A | 3/1991 | Zaunberger | |
| 5,041,064 A * | 8/1991 | Eickhoff et al. ............... | 475/24 |
| 6,082,084 A * | 7/2000 | Reimers et al. ............... | 56/11.9 |
| 6,209,672 B1 | 4/2001 | Severinsky | |
| 6,253,127 B1 * | 6/2001 | Itoyama et al. ................ | 701/22 |
| 6,478,706 B1 * | 11/2002 | Crabb ......................... | 475/18 |
| 6,755,264 B2 * | 6/2004 | Hasegawa et al. ............ | 180/6.2 |
| 6,857,253 B2 * | 2/2005 | Reimers et al. .............. | 56/10.6 |
| 7,052,435 B2 * | 5/2006 | Tabata et al. ................. | 477/107 |
| 7,100,719 B2 * | 9/2006 | Yamaguchi ................ | 180/65.1 |
| 7,100,720 B2 * | 9/2006 | Ishikawa .................... | 180/65.2 |

(Continued)

FOREIGN PATENT DOCUMENTS

DE  37 28 171 C2  3/1989

(Continued)

OTHER PUBLICATIONS

English translation of a Swedish Office Action dated Apr. 21, 2005.

(Continued)

*Primary Examiner*—Jeffrey J Restifo
(74) *Attorney, Agent, or Firm*—Cohen Pontani Lieberman & Pavane LLP

(57) ABSTRACT

A drive for a track-laying vehicle includes a drive shaft connected for driving two chain drive wheels of the track-laying vehicle. At least one differential gear system is arranged for superimposing a rotational speed of a steering drive on at least one of the chain drive wheels. The drive shaft is in drive connection with an electrical machine which can be operated as a generator or as an electric motor and which can be connected to an internal combustion engine by an engaging and disengaging clutch. The electrical machine is operable for charging an electrical energy storage device during operation in generator mode.

26 Claims, 2 Drawing Sheets

U.S. PATENT DOCUMENTS

| | | | |
|---|---|---|---|
| 7,115,065 B2 * | 10/2006 | Tabata et al. | 477/3 |
| 7,117,963 B2 * | 10/2006 | Saito et al. | 180/65.1 |
| 7,201,691 B2 * | 4/2007 | Witzenberger et al. | 475/28 |
| 2002/0079145 A1 | 6/2002 | Kanzler et al. | |
| 2002/0117860 A1 | 8/2002 | Man et al. | |
| 2006/0019787 A1 * | 1/2006 | Witzenberger et al. | 475/18 |
| 2007/0080236 A1 * | 4/2007 | Betz et al. | 237/12.1 |

FOREIGN PATENT DOCUMENTS

| | | |
|---|---|---|
| DE | 296 07 651 U1 | 10/1997 |
| DE | 199 41 705 A1 | 3/2000 |
| EP | 1 199 205 A2 | 4/2002 |
| WO | WO 99/21263 | 4/1999 |

OTHER PUBLICATIONS

Ogorkiewicz, Richard, Technology for Tanks (II), Section 12.8 Electric Transmissions, pp. 303-306 (Surrey 1991).

* cited by examiner

DRIVE FOR A TRACK-LAYING VEHICLE

BACKGROUND OF THE INVENTION

1. Field of the Invention

The invention concerns a drive for a track-laying vehicle having a drive shaft in connection with an electrical machine which can be operated as a generator and an electric motor and which can be connected to an internal combustion engine.

2. Description of the Related Art

Hybrid drives are widely known as drives for passenger vehicles. Hybrid drive vehicles with electric motor drives have been developed as a result of the search for fuel-saving possibilities. The electric current for the drive is supplied by a generator, which is driven by an internal combustion engine. Design concepts are known in which all of the mechanical energy of the internal combustion engine is transformed to electrical energy and then transformed back to mechanical kinetic energy by an electric motor. Other design concepts use a portion of the mechanical energy of the internal combustion engine directly for driving the vehicle and transform the remaining portion to electrical energy. The electrical energy can be used for drive purposes via an electric motor or can be stored in a battery. The vehicle can then draw drive power for the electric drive motor from the battery independently of the internal combustion engine.

U.S. Pat. No. 4,998,591 describes an electromechanical power plant for a full-track vehicle. The power of an internal combustion engine is transformed to electrical energy by a generator and then used again as mechanical drive power via electric motors. To this end, an electric drive motor is provided, which drives a central shaft, which is connected to each of the two track drive gears by a differential gear system. An electric steering motor is provided to steer the track-laying vehicle. This motor has a zero shaft, which engages the differential gear systems from the opposite direction.

SUMMARY OF THE INVENTION

An objective of the present invention is to create an improved drive for a track-laying vehicle.

The object is achieved by a drive for a track-laying vehicle with a drive shaft which drives two chain drive wheels. The drive includes at least one differential gear system and a steering drive, wherein the rotational speed of a steering drive can be superimposed on at least one of the chain drive wheels. The drive shaft is in drive connection with at least one electrical machine which can be operated as a generator or as an electric motor. The electric motor can be connected to at least one internal combustion engine by an engaging and disengaging clutch. An electrical energy storage device is connected to the electric motor so that it can be charged during operation in generator mode.

The power-consuming devices in the track-laying vehicle can be supplied with electrical energy by a drive in accordance with the invention. In military vehicles such as, for example, tanks electric weapons can be supplied with electrical power.

The maximum speed of a track-laying vehicle may be increased compared to a conventionally driven track-laying vehicle by supplying electric power from an electrical energy storage device. The maximum possible acceleration can likewise be increased, and silent low-speed travel is also possible with a track-laying vehicle in accordance with the present invention.

During braking, energy can be fed back into batteries or other electric, mechanical or hydraulic energy storage devices by a starter/generator combination.

A track-laying vehicle according to the invention can be started when the engaging and disengaging clutch is engaged. Here the required electric power can be generated by the starter/generator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
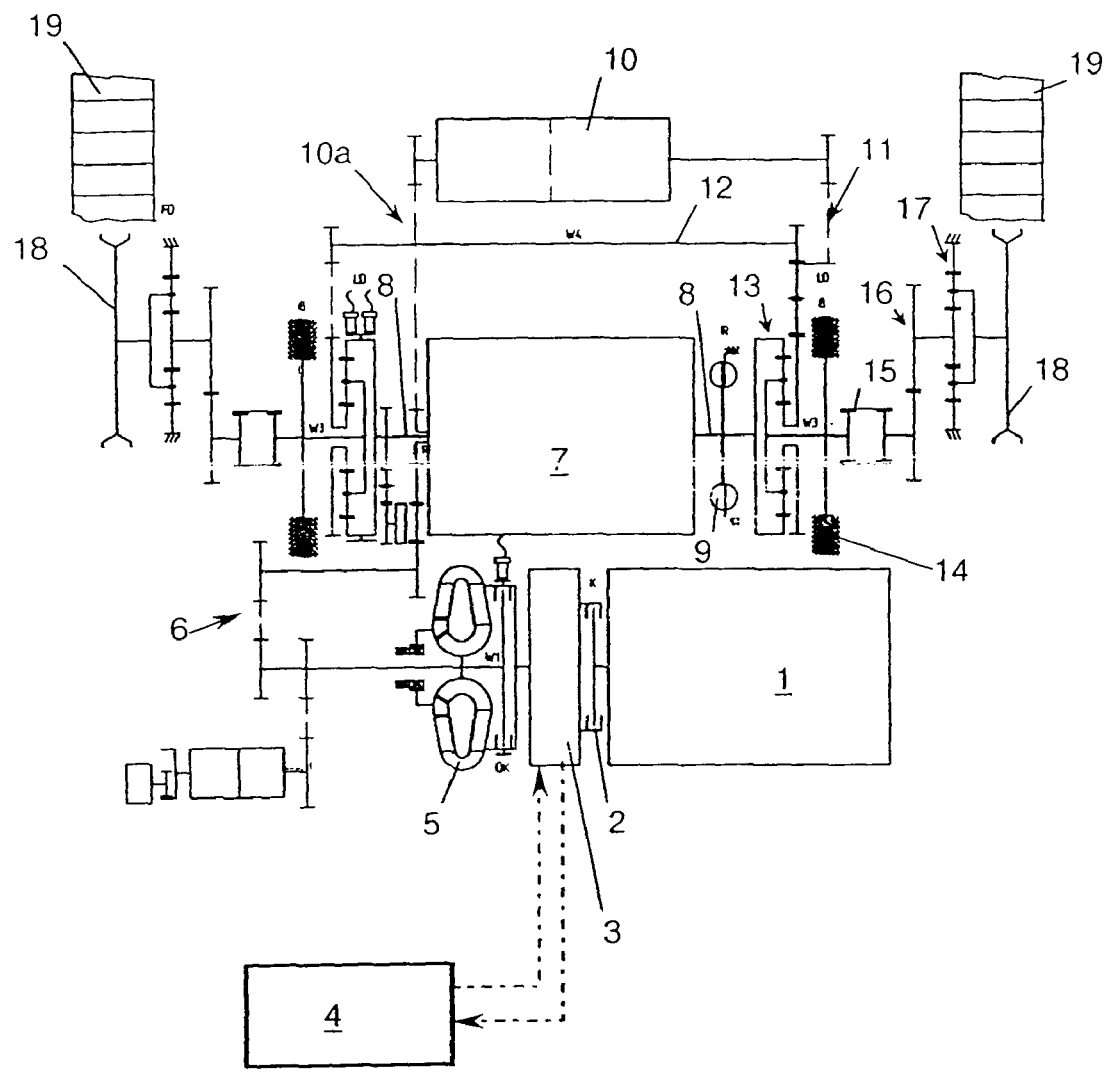
FIG. 1 is a schematic diagram showing an embodiment of a drive for a track-laying vehicle according to the present invention.

FIG. 1 shows a drive of a track-laying vehicle including an internal combustion engine 1, which is detachably connected by a clutch 2 to an electrical machine 3. Instead of an internal combustion engine 1, the electrical machine 3 may be connected to a gas turbine or some other thermal engine which generates the mechanical power. One side of the electrical machine 3 is connectable to the internal combustion engine 1 and the other side is connected by additional drive linkages to the chain wheels 18 of a track-laying vehicle. The electrical machine 3, driven by the internal combustion engine 1, may be operated as a generator for charging electrical energy storage devices such as a battery 4.

The electrical machine 3 is operable as an electric motor when the electric machine 3 is supplied with electric power from, e.g., an electrical energy storage device 4 within the vehicle itself. More specifically, the electric machine 3 may be operable as a starter for starting the internal combustion engine 1 when the clutch 2 is engaged. The electrical machine 3 may be a starter/generator combination such that it is also operable as a generator. The electrical machine 3 and the electrical energy storage device 4 are designed such that it is also possible, when the clutch 2 is disengaged, to drive the track-laying vehicle using the electric machine 3 alone. When the internal combustion engine 1 is shut off and the clutch 2 is disengaged, the electric machine 3 can drive the track-laying vehicle noiselessly, so that silent, low-speed travel is possible.

The clutch 2 may also be shifted under load.

To increase the acceleration and the maximum speed of the vehicle, the electric machine 3, supplied by the electrical energy storage device 4 or another electric energy storage device, supplies additional drive power to the drive in addition to the internal combustion engine 1 when the clutch 2 is engaged.

The electrical machine 3 is preferably designed such that when the electric machine is operating in the generator mode, the electrical machine 3 provides power to the vehicle and to the installed electric power-consuming devices such as, for example, electric weapons in tanks.

During braking, the kinetic energy of the track-laying vehicle may be transformed to electrical energy by the electrical machine 3 operating in the generator mode for charging the electrical energy storage device 4. Additional mechanical and/or hydraulic energy storage devices 4.1 may also be charged by the kinetic energy of the vehicle during braking.

The internal combustion engine 1 of a track-laying vehicle according to the present invention may be started when the clutch 2 engaged. The electric power required for this can be generated by the electric machine 3.

A torque converter 5 acting on a gearshift mechanism 7 via a drive linkage 6 such as, for example, a spur gear drive is connected between the electrical machine 3 and the chain wheels 18. The gearshift mechanism 7 may, for example, comprise an automatic powershift transmission with several speeds, which adapts the torque requirement to the chain drive wheels 18, depending on the wishes of the driver and on the terrain. The gearshift mechanism 7 may also include a reverse gear, which reverses the rotational direction of the output of the gearshift transmission 7. The gearshift mechanism 7 is preferably in working connection with two differential gear systems 13 via a central shaft 8. Each differential gear system 13 is in turn connected to one of the chain drive wheels 18. Each chain drive wheel 18 drives a track-laying track 19 on one side of the vehicle. A side reduction gear 17 is preferably installed on each side between the differential gear system 13 and the chain wheel 18. The side reduction gear 17 is connected when necessary to the output of the differential gear 13 via a drive linkage 16, e.g., a spur gear train, and a fast-release clutch 15.

To steer the track-laying vehicle, the tracks 19 of the two sides of the vehicle must be driven at different speeds. To this end, the rotational speeds of a steering drive 10 are superimposed on the drive by the differential gear systems 13. The steering drive 10 preferably includes a hydraulic pump that interacts with a hydraulic motor. The hydraulic pump is driven by the internal combustion engine 1 or the electric motor 3 by a steering drive linkage 10a and the drive linkage 6. The hydraulic motor of the steering drive 10 drives a zero shaft 12 using another drive linkage 11. The zero shaft 12 is in working connection with sun gears of each of the differential gear systems 13, working in opposing rotational directions. The rotational speed of the steering drive 10 is superimposed on the rotational speed of the central shaft 8, which is in working connection with the differential gear systems 13 via the ring gears. On one side, the steering speed is added to the power takeoff proceeding via the sun wheel of the differential gear system 13 to the chain drive wheel 18, whereas, on the other side, the steering speed is subtracted from the power takeoff. Drive power thus flows from one drive side to the other, which is also referred to as regenerative steering.

This continuously variable steering with superimposed speeds may also be realized with an electrically driven zero shaft instead of with the hydrostatic drive described above.

It is also possible to provide only one differential gear system 13 and to superimpose the rotational speed of the steering drive 10 on only one chain drive wheel 18.

The drive of the invention illustrated as an example here has three independent braking systems: a hydraulic brake 9, functioning as a so-called retarder, which acts on the central shaft 8; mechanical brakes 14, each of which is provided at the power takeoff ends of the differential gear systems 13; and the electrical machine 3, which acts as an electric brake during generator operation.

The essential core of the present invention is that two independent drive motors are integrated into a transmission concept for a track-laying vehicle with continuously variable superimposed steering. The two independent drive motors, when used simultaneously, are able to increase significantly the driving performance of the track-laying vehicle, and can also supply power to the electric power-consuming devices by the operation of the electrical machine in generator mode.

The well-known advantage of diesel/electric drives, namely, that the internal combustion engine and the generator can be installed anywhere in the vehicle regardless of where the transmission is located, may be realized in the present invention by connecting the internal combustion engine or several internal combustion engines to the vehicle drive via universally jointed shafts. Likewise, gas turbines can be used instead of internal combustion engines.

The installation of an electric machine 3 with a high overload capacity allows torque to be produced while the vehicle is traveling and the internal combustion engine or the gas turbine is running in a low-torque range. Especially when the vehicle is to be started off from a standstill, it is possible in this way to apply the maximum torque, even if the torque converter 5 is not used. The internal combustion engine/gas turbine may be jump-started as soon as the vehicle is traveling at a specified speed. Electrical energy storage devices, e.g., capacitors, may be used to supply electric power quickly and for short periods of time. Due to the temperature restrictions of these components, they are preferably installed outside of the engine compartment, e.g., alongside the passenger compartment.

If the track-laying vehicle is a tank, the electrical energy needed to operate the electric motor may be drawn from, and returned to, an electrical ballistic protection system mounted on the outside on a tank hull. So that the tank will still be protected, only the surfaces which are exposed to a low level of threat from outside action (e.g., the rear of a battle tank), for example, may be discharged, and preferably only partially discharged, by computer control.

Figure 2:
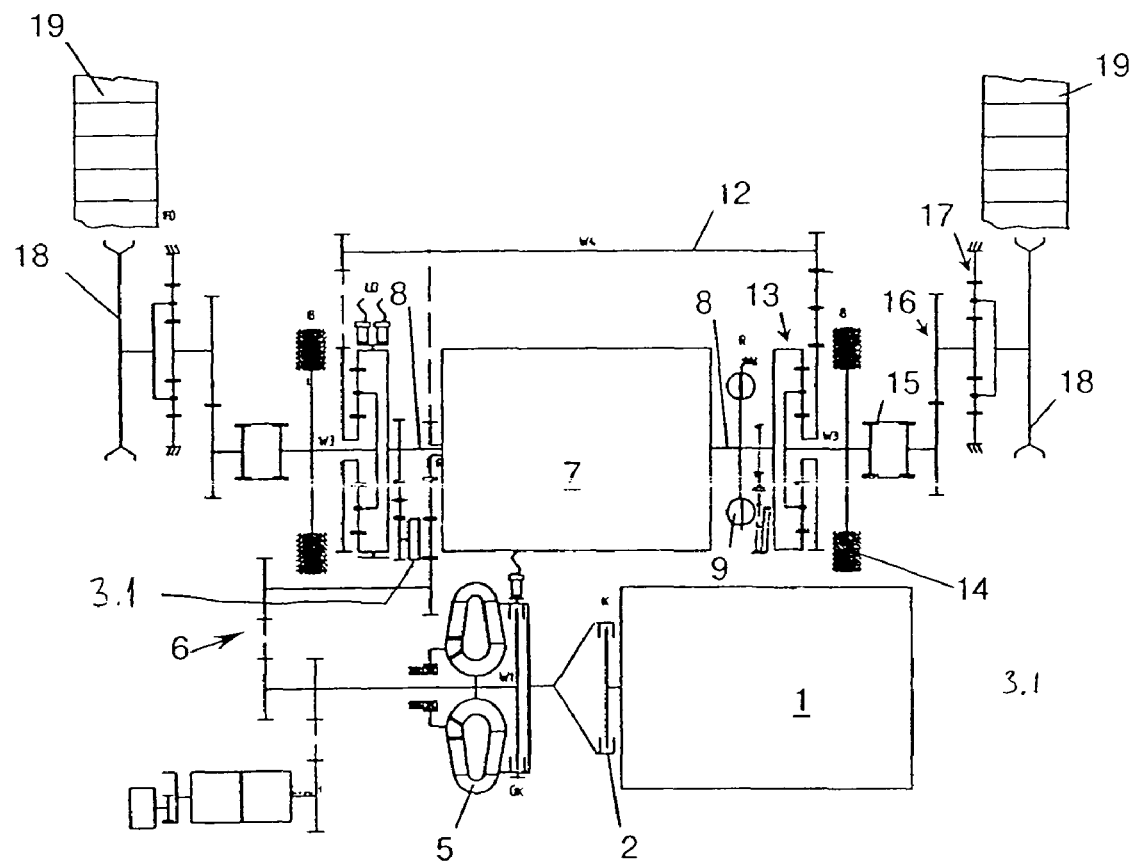
FIG. 2 is schematic diagram showing a further embodiment of the drive for a track-laying vehicle according to the present invention.

In an alternative embodiment of the present invention, the electric motor is not installed between the internal combustion engine and the transmission but rather at each of the two power takeoffs 16 on the sides. As shown in FIG. 2, the electric machines 3.1 may be installed at each of the differential gear systems 13. In the embodiment of FIG. 2, the electric machines 3.1 replace the steering motor 10. The mechanical connection via the zero shaft 12 is preferably maintained so that the deceleration energy of the track on the inside curve can be used to accelerate the track on the outside curve during steering (regenerative steering concept).

If the zero shaft 12 is eliminated, the electric motors in the differential gear systems 13 can be used under suitable computer-monitored control both to drive the vehicle (boost mode) and to steer. The energy is now transferred from the inside-curve track (motor in generator mode) to the outside-curve track (motor in drive mode) by electrical connections.

The electrical computer-aided automatic control of the parallel hybrid drive ensures that the energy storage device is always sufficiently charged. This can also mean that the storage device can be charged rapidly when the vehicle is being operated at high engine speeds. While the vehicle is coasting to a stop, braking, or even traveling downhill, the energy storage device can also be charged by transformation of the kinetic energy to electrical energy.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive for a track-laying vehicle, comprising:
a drive shaft operatively connected for driving two chain drive wheels of the track-laying vehicle;
a steering drive having a rotational speed;
a differential gear system connected to said steering drive for superimposing the rotational speed of said steering drive onto one of the chain drive wheels for effecting superimposed steering of the track-laying vehicle;
an electric machine operable as an electric generator in a generator mode and as an electric motor in a drive mode, said electric machine connected to said drive shaft by a drive connection;
a thermal engine;
a clutch disposed between and engageable with the electric machine and the thermal engine and operable in an engaged state for connecting said thermal engine to said electric machine and a disengaged state for disengaging said thermal engine from said electric machine; and
an electrical energy storage device connected to said electric machine such that said electrical energy storage device is chargeable by said electric machine when said electric machine is operated in said generator mode.

2. The drive of claim 1, wherein said electric machine is operable as an electric brake in the generator mode for transforming the kinetic energy of the track-laying vehicle to electrical energy during coasting or downhill travel and charging the electrical energy storage device.

3. The drive of claim 1, further comprising at least one of mechanical and hydraulic energy storage devices connectable to said drive shaft such that the kinetic energy of the track-laying vehicle is transformed and stored during braking.

4. The drive of claim 1, wherein said electrical energy storage device and said electric machine are designed such that electric machine is operable for solely driving the track-laying vehicle alone when said clutch is in the disengaged state.

5. The drive of claim 1, wherein said electric machine is configured for supplying electrical energy to all electric power-consuming devices of the track-laying vehicle when the electric machine is operated in the generator mode.

6. The drive of claim 1, further comprising at least one of a mechanical brake and a hydraulic brake connectable to said drive shaft.

7. The drive of claim 1, wherein said clutch is operatively arranged for being power-shifted.

8. The drive of claim 1, further comprising a transmission with at least two shiftable forward gears and one reverse gear connected between said electric motor and said drive shaft.

9. The drive of claim 8, wherein said thermal engine comprises one of an internal combustion engine and a gas turbine arranged independently of said transmission, said drive further comprising drive linkage shafts for supplying drive power from said thermal engine to said transmission.

10. The drive of claim 8, wherein said engine and said transmission are automatically controlled for increasing an engine speed of said thermal engine during vehicle travel without changing the vehicle speed desired by the driver for maintaining a sufficient charge of said energy storage device.

11. The drive of claim 1, wherein said thermal engine is an internal combustion engine and said electric machine is operable for starting said internal combustion engine when said clutch is in the engaged state.

12. The drive of claim 1, wherein said steering drive is operatively arranged for allowing continuously variable steering and is one of electrically and hydraulically driven.

13. The drive of claim 1, wherein said electric machine is operable as an electric motor with a high overload capacity in the drive mode for short periods of time, for assisting the operation of said thermal engine when said thermal engine is running in a low-torque range, and wherein said electric machine is operable for starting off the vehicle to a specified driving speed for jump-starting the thermal engine at the specified driving speed.

14. The drive of claim 13, wherein said electric machine draws electrical energy from said electrical energy storage device during said drive mode.

15. The drive of claim 14, wherein said electrical energy storage device comprises capacitors.

16. The drive of claim 1, wherein said electrical energy storage device comprises an energy storage device for an electrical ballistic protection system integrated into the track-laying vehicle, wherein said energy is drawn from said energy storage device such that the areas of the vehicle which have the least threat potential are partially discharged when electrical energy is required.

17. The drive of claim 1, further comprising two electric motors connected on said drive shaft.

18. The drive of claim 17, further comprising two differential gear systems, and one of said two electric motors is integrated into each of said differential gear systems.

19. The drive of claim 18, wherein said electric motors in said differential gear systems are operable for driving the track-laying vehicle, and in that the power transfer in regenerative steering occurs by electrical connections.

20. The drive of claim 18, wherein said steering drive includes said two electric motors integrated into differential gear systems, said drive further comprising a zero shaft mechanically connecting said differential gear mechanisms.

21. The drive of claim 17, wherein said steering drive includes said two electric motors integrated into differential gear systems, said drive further comprising a zero shaft mechanically connecting said differential gear mechanisms.

22. The drive of claim 1, further comprising two differential gear systems and a zero shaft.

23. The drive of claim 22, wherein the two differential gear systems are connected to the steering drive for superimposing the rotational speed of the steering drive onto the two chain drive wheels for effecting superimposed steering of the track-laying vehicle, the rotational speed of the steering drive being superimposed by adding the rotational speed of the steering drive to the rotational speed of one of the two chain drive wheels and subtracting the rotational speed of the steering drive from the rotational speed of the other of the two chain drive wheels.

24. The drive of claim 22, wherein the steering drive driving the zero shaft, the central shaft being in working connection with the two differential gear systems, and the zero shaft also being in working connection with the two differential gear systems, working in opposing rotational directions.

25. The drive of claim 1, wherein the track-laying vehicle comprises a tank.

26. A drive for a track-laying vehicle, comprising:
- a drive shaft operatively connected for driving two chain drive wheels of the track-laying vehicle;
- a steering drive having a rotational speed;
- a differential gear system connected to said steering drive for superimposing the rotational speed of said steering drive onto one of the chain drive wheels for effecting superimposed steering of the track-laying vehicle;
- an electric machine operable as an electric generator in a generator mode and as an electric motor in a drive mode, said electric machine connected to said drive shaft by a drive connection;
- a thermal engine comprising an internal combustion engine;
- a clutch disposed between and engageable with the electric machine and the thermal engine and operable in an engaged state for connecting said thermal engine to said electric machine and a disengaged state for disengaging said thermal engine from said electric machine; and
- an electrical energy storage device connected to said electric machine such that said electrical energy storage device is chargeable by said electric machine when said electric machine is operated in said generator mode;
- wherein said electric machine is operable for starting said internal combustion engine when said clutch is in the engaged state.

* * * * *